S. J. MURPHY.
STORAGE CYLINDER OR VESSEL FOR COMPRESSED AIR OR GAS.
APPLICATION FILED DEC. 6, 1917.
1,350,666. Patented Aug. 24, 1920.
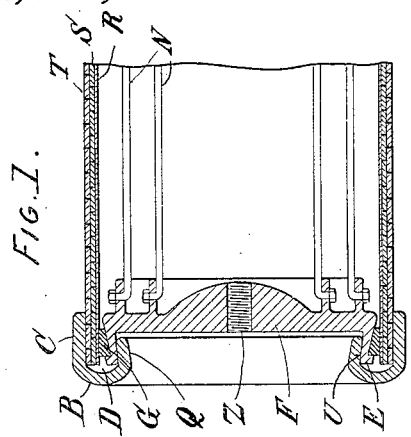
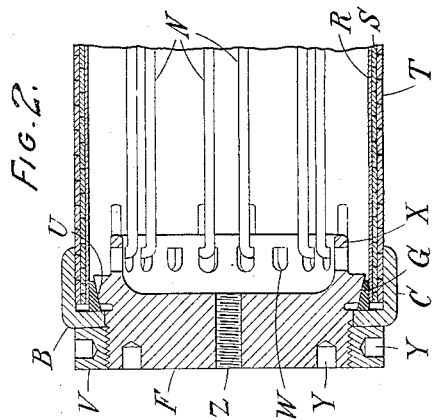

UNITED STATES PATENT OFFICE.

STEPHEN JAMES MURPHY, OF DROGHEDA, IRELAND.

STORAGE CYLINDER OR VESSEL FOR COMPRESSED AIR OR GAS.

1,350,666.   Specification of Letters Patent.   Patented Aug. 24, 1920.

Application filed December 6, 1917. Serial No. 205,770.

*To all whom it may concern:*

Be it known that I, STEPHEN JAMES MURPHY, a subject of the King of Great Britain and Ireland, residing at St. Laurence Gate, Drogheda, county Louth, Ireland, have invented new and useful Improvements in Storage Cylinders or Vessels for Compressed Air or Gas, of which the following is a specification.

This invention is an improvement in storage cylinders or vessels for compressed air or gas. It provides in a light and convenient form a strong and safe substitute for the usual heavy cylinders now used for sundry purposes, but found to be very cumbersome for use upon automobiles and for transit in general.

For convenience, the cylinders or vessels in question will be referred to herein merely as cylinders, but it must be understood that in some constructions, they can be made pliable and formed in any length so as to be capable of bending around corners or assuming various conformations suitable for economizing space.

The cylinders made according to this invention can be constructed inexpensively in various lengths, so that for a particular purpose, for instance, a gas container for use on tramway or road automobiles, the available space may be occupied with the most suitable length of cylinder without waste. At the same time, these cylinders are more elastic and better adapted to withstand sudden shocks and high pressures, than if made in the usual manner.

Figure 1 illustrates a sectional view of a fragment of a cylinder embodying the invention.

Fig. 2, a similar view of a slightly modified form of the invention.

In the form shown by Fig. 1, the wall of the cylinder consists of a single thin tube R of well-tempered sheet steel, and is reinforced against radial expansive pressure by two layers of steel tape S T wound spirally around it on the outside. The ends of the cylinder R are bound with metal rings C, screwed or passed thereon, having inwardly turned flanges B overlapping the cylinder ends, thus forming an annular recess D within the cylinder rim at each of its ends.

A flange Q is provided on the ring C, which can be bent inward, as shown, and expanded against the edge E of the cap F, the contacting surfaces being bent at an acute angle so as to lock together.

The spaces between the cap rim U and the cylinder end R forms an annular stuffing box by which the joint is hermetically sealed. The packing ring for this purpose may be of suitable soft metal G and may have grooves holding rings of still more compressible material. Both the packing ring and the stuffing box are preferably of wedge section, the thick part outermost, tending to increase the sealing effect when the caps F at the two ends of the cylinder are forced apart.

The strengthening rods N extend through apertures formed in a flange of the cap as fully shown in the drawing.

Rods N sustain the expansion strain of the gas and hold the opposite ends in place.

The end caps F are provided with threaded holes Z for the insertion of plugs or nozzles for admitting and discharging the air or gas.

In the form shown the securing flange V is separate from the rim U and is made as a separate ring which can be screwed on and off the cap F. By this means, the structure formed by the two end pieces and the tension rods N can be readily removed from the cylinder body for purposes of adjustment or any other cause. Previous to applying the flange ring V, the wedge-section packing ring G will be laid upon the conical rim U, followed by the annular outer member B (having flange C) for keeping the packing in position and pressing it home. Both the cap F and the flange ring V may have recesses Y for the insertion of tools which hold or engage them when being screwed or unscrewed in relation to one another.

The caps have threaded apertures Z for the reception of screw plugs.

In the forms illustrated, the cylinder may be formed of solid steel, or if pliability is desired, it may be composed of interlocked helical ribbon, as in flexible tubing of known kind. In this case the coils S T of reinforcing steel tape, or at least the first layer S, may be wound in direction opposite to those of the cylinder, to insure crossing its joints. The coil T may be wound in an opposite direction to the direction of the coil S.

In this form, as in the other forms, the main or internal cylinder A may be either metal ribbon wound helically, with edges interlocked, or a thin plain metal tube.

I claim:

1. A storage cylinder or vessel for compressed air or gas, comprising a gas-tight cylinder or tube, end pieces for such cylinder or tube, each end piece being composed of two circular members adapted to engage with one another, a packing ring between the inner of said two members and the inner wall of the cylinder or tube, and means for connecting the inner member of one end piece firmly with the inner member of the opposite end piece, so that the longitudinal stress of the internal pressure may be borne by said connecting means rather than by the cylinder or tube.

2. A storage cylinder or vessel for compressed air or gas, comprising a gas-tight cylinder or tube, a layer or lining of helically wound metal ribbon against the same for reinforcing it against internal radial pressure, end pieces for such cylinder or tube, each end piece being composed of two circular members adapted to engage with one another, a packing ring between the inner of said two members and the inner wall of the cylinder or tube, and means for connecting the inner member of one end piece firmly with the inner member of the opposite end piece, so that the longitudinal stress of the internal pressure may be borne by said connecting means rather than by the cylinder or tube.

3. A storage cylinder or vessel for compressed air or gas, comprising a gas-tight cylinder or tube, a coil of reinforcing tape wound upon said cylinder or tube and another similar coil wound upon said coil in an opposite direction, said coils reinforcing the cylinder or tube against internal radial pressure, end pieces for such cylinder or tube, each end piece being composed of two circular members adapted to engage with one another, a packing ring between the inner of said two members and the inner wall of the cylinder or tube, and means for connecting the inner member of one end piece firmly with the inner member of the opposite end piece, so that the longitudinal stress of the internal pressure may be borne by said connecting means rather than by the cylinder or tube.

4. A storage cylinder or vessel for compressed air or gas, comprising a gas-tight cylinder or tube, end pieces for such cylinder or tube, each end piece being composed of two circular members adapted to engage with one another, a packing ring between the inner of said two members and the inner wall of the cylinder or tube, ties within the latter connecting together the two end pieces thereof, and a formation upon each of the inside faces of the latter upon which said ties are hooked.

5. A storage cylinder or vessel for compressed air or gas, comprising a gas-tight cylinder or tube, end pieces for such cylinder or tube, each end piece being composed of two circular members adapted to engage with one another, an inwardly directed cylindrical flange upon the outer of said two members, and an outwardly directed cylindrical flange upon the inner of said two members, said two flanges constituting together a stuffing box and gland, of which the latter forms the gland, in conjunction with packing material within the stuffing box, means for forcing said two members together, said packing thereby becoming expanded against the inner wall of the said cylinder or tube, together with means for connecting the inner member of one end piece firmly with the inner member of the opposite end piece, so that the longitudinal stress of the internal pressure may be borne by said connecting means rather than by the cylinder or tube.

6. A storage cylinder or vessel for compressed air or gas, comprising a gas-tight cylinder or tube, end pieces for such cylinder or tube, each end piece being composed of two circular members adapted to engage with one another, an inwardly directed cylindrical flange upon the outer of said two members, and an outwardly directed cylindrical flange upon the inner of said two members, said two flanges constituting together a stuffing box and gland, of which the latter forms the gland, in conjunction with packing material within the stuffing box, threaded members passed through the two members of the end piece at each end, their eyes or hooks being on the inner ends, collars and gas-tight washers also upon said inner ends, nuts upon their outer ends for forcing two said members of an end-piece together, said packing thereby becoming expanded against the inner wall of the said cylinder or tube, together with means for connecting the inner member of one end piece firmly with the inner member of the opposite end piece, so that the longitudinal stress of the internal pressure may be borne by said connecting means rather than by the cylinder or tube.

7. A storage cylinder or vessel for compressed air or gas, comprising a gas-tight cylinder or tube, end pieces for such cylinder or tube, each end piece being composed of two circular members adapted to engage with one another, the outer of said members being a ring having an inwardly turned flange which overlaps the end of the cylinder or tube, and the inner member having an outwardly extending flange or stop, which by overlapping said flange prevents the end-piece from being forced into the cylinder or tube; a packing ring between the inner of said two members and the inner wall of the cylinder or tube, and means for connecting the inner member of one end piece firmly with the inner member of the opposite end piece, so that the longitudinal stress of the internal pressure may be borne by the said connecting means rather than by the cylinder or tube.

STEPHEN JAMES MURPHY.

Witness:
M. McKEEVER.